Feb. 10, 1953　　　P. S. MONTGOMERY　　　2,628,043
TAILLESS AIRPLANE

Filed Feb. 13, 1951　　　　　　　　　2 SHEETS—SHEET 1

INVENTOR.
Paul S. Montgomery

Feb. 10, 1953 P. S. MONTGOMERY 2,628,043
TAILLESS AIRPLANE

Filed Feb. 13, 1951 2 SHEETS—SHEET 2

INVENTOR.
Paul S. Montgomery

Patented Feb. 10, 1953

2,628,043

UNITED STATES PATENT OFFICE 2,628,043

TAILLESS AIRPLANE

Paul Samuel Montgomery, Oklahoma City, Okla., assignor to Lloyd-Avon, Ltd., Oklahoma County, Okla.

Application February 13, 1951, Serial No. 210,692

1 Claim. (Cl. 244—13)

This is a basic design for a true tailless airplane that provides advantages both aerodynamically and structurally, as well as economically, over all previous airplane designs. It is the inventor's belief that this basic design is the ultimate in the airplane field inasmuch as the drag and sinking speed are so low they are almost unbelievable. Furthermore, this basic tailless airplane design is the only airplane of the tailless class that provides perfect directional stability through its wing design, therefore, not requiring any manner or form of directional stabilizing devices such as vertical stabilizers, offset thrust lines in multi-engine airplanes, etc.

Figure 1:
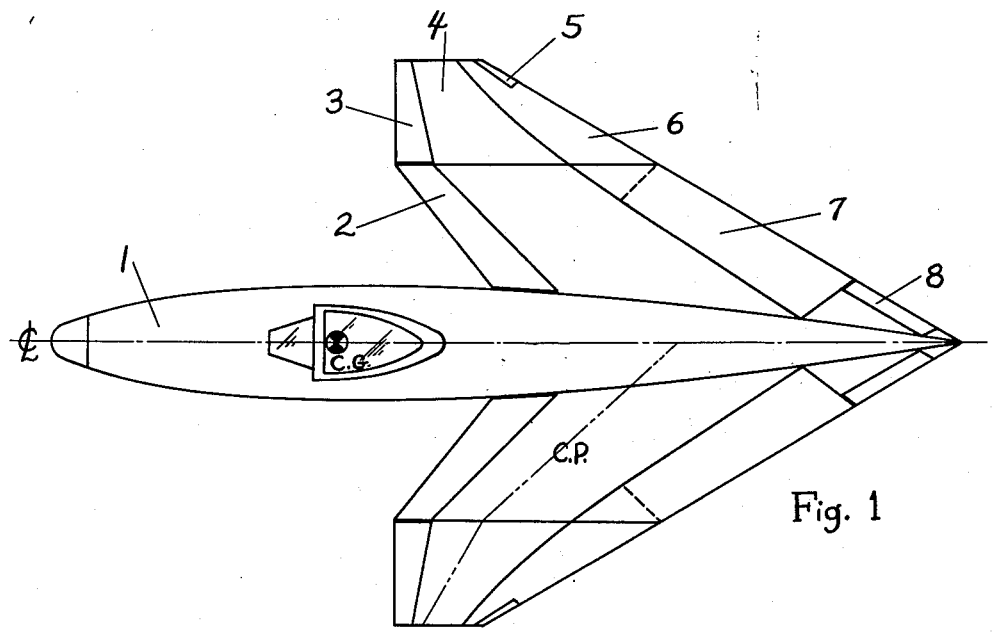
Figure 2:
Figure 3:
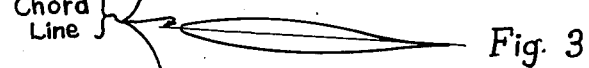
Figure 4:
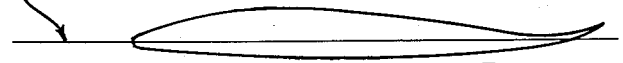
Figure 5:
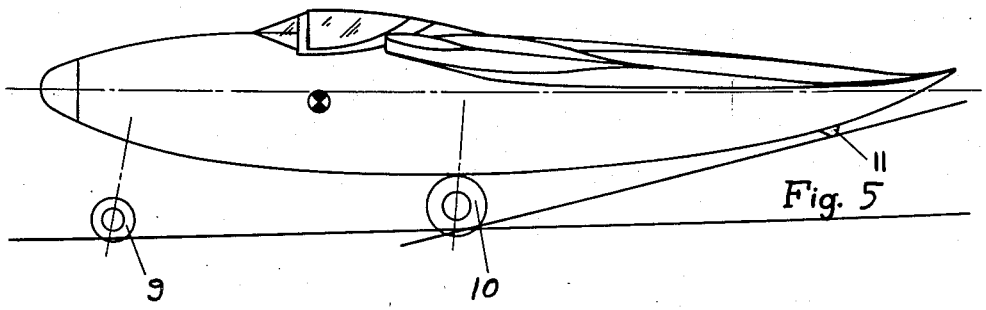
Figure 6:
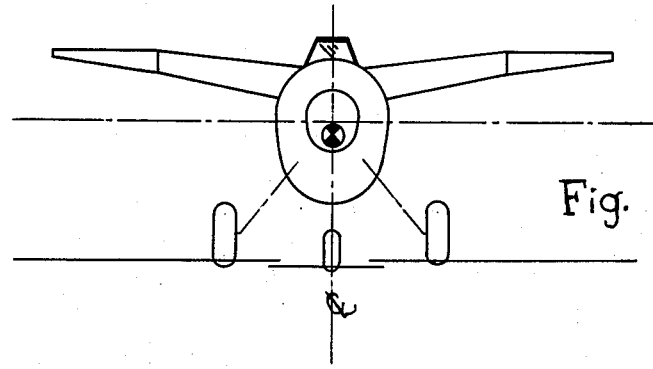
Figure 7:
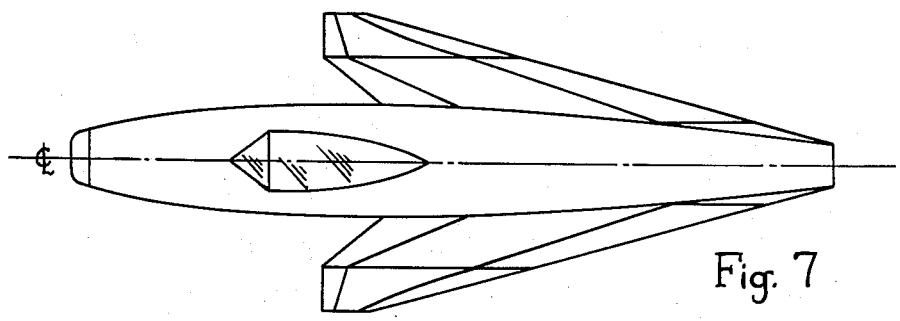
Figure 8:
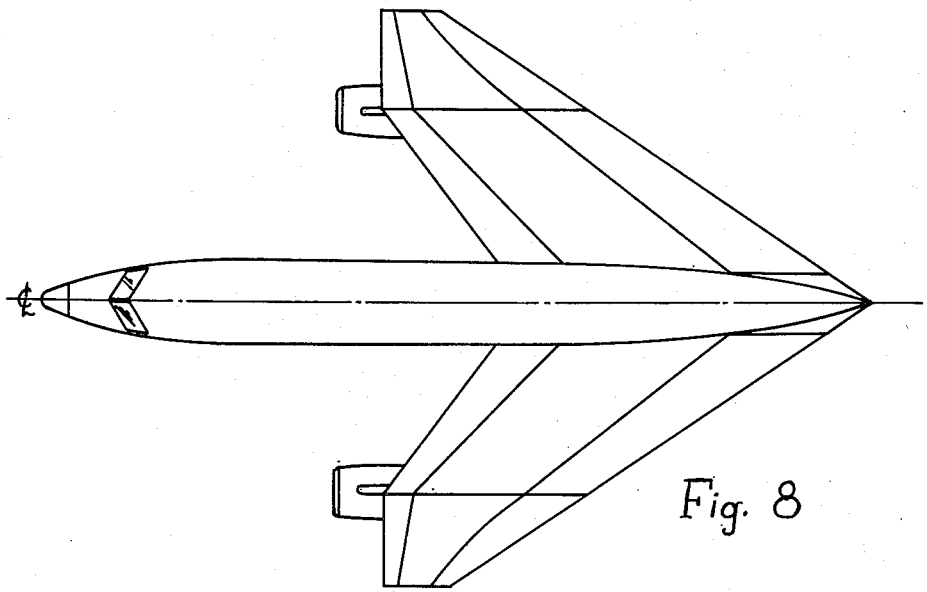

The two drawings contain the following illustrations: Figure 1 is the top view of the basic design; Figure 2 is the tip section of the wing; Figure 3 is the root section of the outboard wing panel; Figure 4 is the root section of the inboard wing panel; Figure 5 is the side view of the basic design; Figure 6 is the front view of the basic design; Figure 7 is the top view of the basic design as applied to a high speed jet fighter; and Figure 8 is the basic design as applied to a multi-engine jet transport or bomber, with jet engines slung underneath the wing.

A three view drawing of the basic design is illustrated in Figures 1, 5, and 6. This airplane shows no power plants, however, while it can be used as a glider, either propeller engines or jet engines, or any form of engines or combination of engines can be employed.

Also, any form of landing gear or sea plane design can be employed. A tricycle type of gear with tail bumper (Numbers 9, 10, and 11) is illustrated on the drawings of the basic design.

The basic airplane design can be applied to any and all types of airplanes and guided missiles. High speed airplanes can use a short wing span with high sweep forward trailing edge (see Figure 7) while lower speed airplanes can use large wing span with less sweep forward trailing edge (see Figure 8). Also, the wing can be located in any position, for example, high wing, mid-wing, low wing, etc.

This basic design may appear to be similar to the tailless airplane for which Patent 2,417,189 was issued to G. W. Cornelius on March 11, 1947. However, the details will prove quite different. The only similarity of my basic design to the above mentioned patent is that both have a sweep forward center of pressure (C. P.).

My basic design has proven (through numerous models) to be directionally stable through inherent directional stability incorporated into the basic design which also provides lateral stability. The sweep forward of the center of pressure and settings of the airfoils in relation to the center of gravity (C. G.) provides longitudinal stability.

In Figure 1, Number 1 is the fuselage; 2 is a leading edge flap; 3 is a leading edge flap that can also be used for both flight control (details will appear below) and as a leading edge flap; 4 is the wing, which consists of an inboard panel with dihedral and an outboard panel without dihedral; 5 is a trim tab; 6 and 7 can be one flap unit or separate, depending upon the type of flight control utilized; and 8 is a trim tab.

Flight control can be accomplished in several different ways. A few examples are as follows: Leading edge flap 3 is used exclusively for flight control. Leading edge flap 3 on both wings moves down for the airplane to descend and up for the airplane to ascend. To turn, leading edge flap 3 could move up on one wing and down on the other wing, or it could be sufficient on some airplanes for leading edge flap 3 to move only on one wing. This is due to the fact that the center of pressure of the total wing would move from the longitudinal center line (C. L.) of the airplane to the side that gives the greatest lift, thereby causing the airplane to turn. In this case full span trailing edge flaps 6 and 7 would be employed in addition to the leading edge flaps 2. Trim tabs 8 would be used only for longitudinal trim while trim tabs 5 would be used for longitudinal and/or directional/lateral trim.

Trailing edge flap 6 could be used for ailerons and trailing edge flap 7 for elevators, thereby using leading edge flaps 2 and 3 for landing flaps only. Or trailing edge flap 6 could be used exclusively for flight control, similar to leading edge flap 3 as described above, and thereby use trailing edge flap 7 for landing flaps only. Trim tabs would be employed as described above.

It would also be possible to use a combination of leading and trailing edge flight controls as described above. Or other controls could be employed such as plug ailerons, various flaps to create drag to assist in turning (as used on other tailless airplanes), etc.

In this basic design the center of gravity must be located well forward of the center of pressure of the mean aerodynamic chord. The root airfoil must be set at a zero or low angle of incidence with its trailing edge turned up; the root section of the outboard panel must be set at a slightly higher angle of incidence and the tip section at a still higher angle of incidence. The trailing edge of the wing is turned up only at the back of the wing as illustrated in Figure 5. These settings and locations provide the longitudinal stability.

The outboard wing panels are fixed to the inboard panels and are not moveable, as in the case of Patent Number 2,417,189.

Directional stability is accomplished by using a sweep forward center of pressure and outboard wing panels with leading edges that are absolute perpendicular to the longitudinal center line of the airplane. This permits the inboard wing panels to have a sweep forward leading edge, however, a more efficient wing structurally can be constructed with the inboard wing panels also perpendicular to the center line of the airplane. This does not cause any appreciable loss in directional stability. Dotted lines on Figure 4 indicate an airfoil section with open nose for air intake, where sweep forward inboard wing panels are employed.

Only the minimum amount of wing tip should be clipped for maximum efficiency. It is not possible to extend the trailing edge until it meets the leading edge due to the fact that the airfoil at that point would be completely vertical, thereby providing no lift and considerable drag.

In securing directional stability, it is also necessary to use dihedral in the inboard wing panels in combination with no dihedral in the outboard wing panels. This also results in the desired lateral stability.

In the case of the Navy using this design, it would be possible to increase the aircraft carrier capacity due to the smaller area required for this type of airplane (see Figure 7). This would result in the saving of considerable money inasmuch as fewer carriers would be required for any specific mission.

Three factors provide high speed airplane designs, namely: a low aspect ratio, a thin airfoil section, and sweep back. However, the first two factors combined are as effective as the third and also, sweep back is not desirable for supersonic airplanes. It is possible to employ the first two factors to the absolute ultimate on my basic design; to an extent that cannot even be approached by any other design.

The exact areas, angle of incidences, dihedral, movement of controls, etc., will be determined by the particular requirements of the airplane that my basic design is applied to. It is of course possible to make all kinds of variations and modifications which would be too numerous to set forth, however, it is possible to set forth the fundamental basic airplane design, as follows in my claim.

I claim:

An airplane structure consisting of only a fuselage and wing with the center of gravity located well forward of the center of pressure of the mean aerodynamic chord, while the wing structure is constructed with inboard panels having dihedral and outboard panels having no dihedral, with trailing edges swept forward and leading edges of inboard panels swept forward while leading edges of outboard panels are absolutely perpendicular to the longitudinal center line of the airplane, the root of each inboard panel having zero or low angle of incidence with the root of each outboard panel having slightly higher angle of incidence and tip of each outboard panel having even higher angle of incidence, said wing in planform having tips clipped just before trailing and leading edges join, with the trailing edge of the inboard panels only being turned up slightly, said wing having full trailing and leading edge flaps for flight control and low landing speed of craft, and said wing having tabs at tips and next to fuselage for trim.

PAUL SAMUEL MONTGOMERY.

REFERENCES CITED

The following references are of record in the file of this patent:

UNITED STATES PATENTS

| Number | Name | Date |
|---|---|---|
| 1,862,102 | Stout | June 7, 1932 |
| 1,915,055 | Fauvel | June 20, 1933 |
| 2,191,842 | Back | Feb. 27, 1940 |
| 2,417,189 | Cornelius | Mar. 11, 1947 |

FOREIGN PATENTS

| Number | Country | Date |
|---|---|---|
| 203,654 | Great Britain | May 2, 1923 |